US012676843B2

(12) United States Patent
Linecker et al.

(10) Patent No.: US 12,676,843 B2
(45) Date of Patent: *Jul. 7, 2026

(54) SECURE AUTHENTICATION FOR ACCESSING REMOTE RESOURCES

(71) Applicant: Apple Inc., Cupertino, CA (US)

(72) Inventors: Anton Franz Linecker, Woodland Hills, CA (US); Yuval Kossovsky, Pittsburgh, PA (US); Martin Libich, Santa Monica, CA (US)

(73) Assignee: Apple Inc., Cupertino, CA (US)

( * ) Notice: Subject to any disclaimer, the term of this patent is extended or adjusted under 35 U.S.C. 154(b) by 30 days.

This patent is subject to a terminal disclaimer.

(21) Appl. No.: 18/741,634

(22) Filed: Jun. 12, 2024

(65) Prior Publication Data

US 2024/0333701 A1     Oct. 3, 2024

Related U.S. Application Data

(63) Continuation of application No. 17/646,779, filed on Jan. 3, 2022, now Pat. No. 12,034,713, which is a
(Continued)

(51) Int. Cl.
*H04L 9/40*          (2022.01)

(52) U.S. Cl.
CPC .............. *H04L 63/08* (2013.01); *H04L 63/18* (2013.01)

(58) Field of Classification Search
CPC .............. G06F 21/31; G06F 21/34–35; G06F 21/44–445; G06F 2221/2103; H04L 9/3226–3228; H04L 9/3271–3273; H04L 63/08; H04L 63/083–0846; H04L 63/0853; H04L 63/18; H04L 63/20; H04L 2463/082
See application file for complete search history.

(56) References Cited

U.S. PATENT DOCUMENTS

| | | | |
|---|---|---|---|
| 6,360,254 B1 | 3/2002 | Linden et al. | |
| 6,782,080 B2 | 8/2004 | Leivo et al. | |

(Continued)

FOREIGN PATENT DOCUMENTS

| | | |
|---|---|---|
| WO | 2008098004 A1 | 8/2008 |

OTHER PUBLICATIONS

Solin, Daniel, "Generating One-Time URLs with PHP," Mar. 20, 2003, Dev Articles [online]; retrieved from the Internet, URL: http://www.devarticles.com, [retrieved on Aug. 28, 2008], 4 pages.
(Continued)

*Primary Examiner* — Kevin Bechtel
(74) *Attorney, Agent, or Firm* — Kubota & Basol LLP

(57) ABSTRACT

Methods, systems, and apparatus, including computer program products, for secure authentication for accessing remote resources are disclosed. In some implementations, a user is authenticated for a first time on an interface using a first communications channel; the user is authenticated a second time on the interface using a second communications channel; access privileges are determined based on authenticating the user for the second time; and a random Uniform Resource Locator (URL) is generated based on the access privileges, where the random URL is single-use and indirectly associated with a requested resource.

20 Claims, 5 Drawing Sheets

Related U.S. Application Data continuation of application No. 16/215,510, filed on Dec. 10, 2018, now Pat. No. 11,218,460, which is a continuation of application No. 12/268,355, filed on Nov. 10, 2008, now abandoned.

(56) References Cited

U.S. PATENT DOCUMENTS

| | | | |
|---|---|---|---|
| 6,993,658 B1 * | 1/2006 | Engberg | H04L 63/083 709/219 |
| 7,904,946 B1 * | 3/2011 | Chu | H04W 12/068 726/8 |
| 2005/0268107 A1 | 12/2005 | Harris et al. | |
| 2005/0273443 A1 | 12/2005 | Dezonno | |
| 2006/0059556 A1 | 3/2006 | Royer et al. | |
| 2006/0206709 A1 | 9/2006 | Labrou et al. | |
| 2006/0294392 A1 | 12/2006 | Veprek et al. | |
| 2007/0136573 A1 | 6/2007 | Steinberg | |
| 2007/0219910 A1 | 9/2007 | Martinez | |
| 2007/0245027 A1 | 10/2007 | Ghosh et al. | |
| 2008/0002726 A1 | 1/2008 | Haung et al. | |
| 2008/0022375 A1 | 1/2008 | Stanley | |
| 2008/0072294 A1 | 3/2008 | Chatterjee | |
| 2008/0077796 A1 | 3/2008 | Lund et al. | |
| 2008/0086770 A1 | 4/2008 | Kulkarni et al. | |
| 2008/0098464 A1 * | 4/2008 | Mizrah | G06F 21/36 726/5 |
| 2008/0115225 A1 | 5/2008 | Jogand-Coulomb et al. | |
| 2008/0134343 A1 | 6/2008 | Pennington et al. | |
| 2008/0168543 A1 | 7/2008 | von Krogh | |
| 2008/0295159 A1 | 11/2008 | Sentinelli | |
| 2009/0069038 A1 | 3/2009 | Olague et al. | |
| 2009/0077601 A1 | 3/2009 | Brailean et al. | |
| 2009/0144810 A1 | 6/2009 | Gilboy | |
| 2009/0228965 A1 | 9/2009 | Klippgen | |
| 2009/0241175 A1 | 9/2009 | Trandal et al. | |
| 2009/0276839 A1 | 11/2009 | Peneder | |
| 2010/0077447 A1 | 3/2010 | Dholakia et al. | |
| 2010/0085154 A1 * | 4/2010 | Park | G06F 21/6209 382/176 |
| 2010/0122327 A1 | 5/2010 | Linecker et al. | |
| 2010/0180328 A1 | 7/2010 | Moas et al. | |
| 2010/0299731 A1 | 11/2010 | Atkinson | |
| 2013/0347129 A1 | 12/2013 | Samuelsson et al. | |
| 2019/0109838 A1 | 4/2019 | Linecker et al. | |
| 2022/0239637 A1 | 7/2022 | Linecker et al. | |

OTHER PUBLICATIONS

Chou, David, "Strong User Authentication on the Web," Aug. 2008, MSDN: The Architecture Journal [online]; Retrieved from the Internet, URL: http://msdn.microsoft.com/enus/ library/ cc83835l(printer).aspx, [retrieved on Aug. 28, 2008], 10 pages.

De Jong, Cornel, "Online authentication methods," System and Network Engineering, Univeriteit van Amsterdam, 2007-2008, [online], [retrieved from the Internet], URL: http://staff.science.uva.nl/~delaat/ rp/2007-2008/p30/report.pdf, [retrieved Aug. 2008], 32 pages.

""Reeltime Infotainment Ltd Selects SecureMedias DRM Solution to Protect Hollywood VOD,"" PR Newswire Europe, Ltd., Feb. 21, 2008, [online]; retrieved from the Internet; URL. http://www.prnewswire.co.uk/cgi/news/releaseid=164478, [retrieved on Aug. 27, 2008], 2 pages.

"Sybase Tech Wave 2007: Sybase 365 Extends Mobile Banking Services to the Americas," SYS-CON Media Inc., 2008, [online], retrieved from the Internet, URL: http://pbdj.syscon.com/node/ 413100/print, [retrieved on Aug. 27, 2008], 1 page.

KeePass, version 2.03 Source Code. https://sourceforge.net/projects/ keepass/files/KeePass%202.x/2.03/KeePass-2.03-Alpha-Source.zip/ download. Published: Oct. 11, 2007. (Year 2007).

Microsoft Documentation, .NET Framework 2.0:Clipboard Class. https://docs.microsoft.com/en-us/dotnet/api/system.windows.forms. clipboardview=netframework-2.0.

* cited by examiner

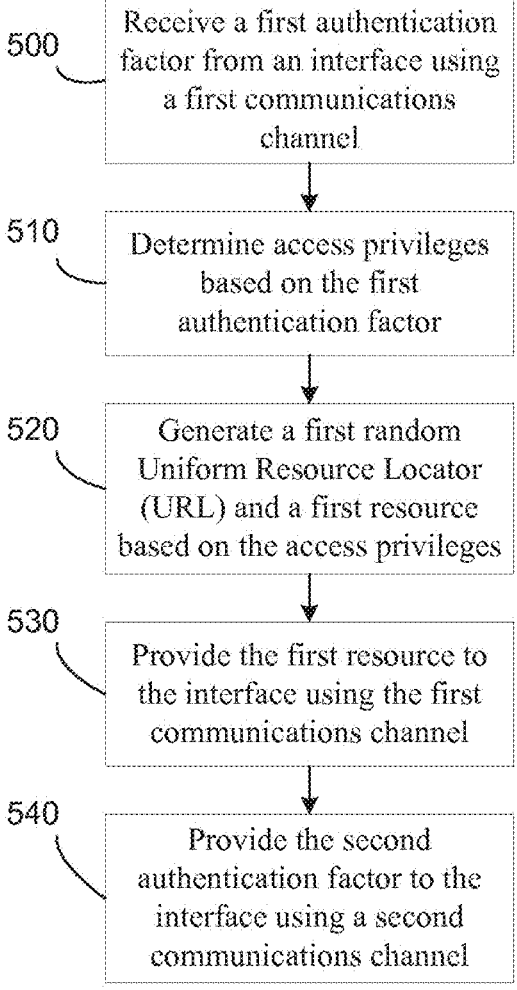

500 — Receive a first authentication factor from an interface using a first communications channel 510 — Determine access privileges based on the first authentication factor 520 — Generate a first random Uniform Resource Locator (URL) and a first resource based on the access privileges 530 — Provide the first resource to the interface using the first communications channel 540 — Provide the second authentication factor to the interface using a second communications channel

*FIG. 5*

SECURE AUTHENTICATION FOR ACCESSING REMOTE RESOURCES

CROSS-REFERENCE TO RELATED APPLICATIONS

The present application is a continuation of U.S. patent application Ser. No. 17/646,779, entitled "SECURE AUTHENTICATION FOR ACCESSING REMOTE RESOURCES," filed Jan. 3, 2022, which is a continuation of U.S. patent application Ser. No. 16/215,510, entitled "SECURE AUTHENTICATION FOR ACCESSING REMOTE RESOURCES," filed Dec. 10, 2018, issued on Jan. 4, 2022 as U.S. Pat. No. 11,218,460, which is a continuation of U.S. patent application Ser. No. 12/268,355, entitled "SECURE AUTHENTICATION FOR ACCESS- ING REMOTE RESOURCES," filed Nov. 10, 2008, the contents of all of which are incorporated by reference herein in their entirety for all purposes.

FIELD

The subject matter of this specification generally relates to secure authentication.

BACKGROUND

A hallmark of modern secure authentication methods is that they use authentication factors that are classified into three classes. Traditional authentication factors include: (i) something a user has (e.g., a security dongle); (ii) something the user knows (e.g., a password); and (iii) something the user is (e.g., biometrics).

Traditional multi-factor authentication methods authenti- cate one or more of these factors. Increasing the number of authentication factors that are used can increase the level of confidence in a secure authentication. However, increasing the number of authentication factors may decrease a level of comfort (e.g., convenience) for a user.

SUMMARY

Secure authentication for accessing remote resources is disclosed. In some implementations, a user is authenticated for a first time on an interface using a first communications channel; the user is authenticated a second time on the interface using a second communications channel; access privileges are determined based on authenticating the user for the second time; and a random Uniform Resource Locator (URL) is generated based on the access privileges, where the random URL is single-use and indirectly associ- ated with a requested resource.

Particular embodiments of the subject matter described in this specification can be implemented to realize one or more of the following advantages. Using out of band authentica- tion, e.g., using a communication channel/method for authentication that is different from a communication chan- nel/method used for requesting and receiving a resource, increases a level of security in the authentication process. Using Short Message Service (SMS) text messages for challenge/response authentication can avoid spoofing because each client has a unique identifier, e.g., a Subscriber Identity Module (SIM) chip. In addition, a challenge SMS text message can alert a user of a potential security breach (e.g., unauthorized access attempt). Furthermore, using out of band authentication on a single client can increase the convenience of using challenge/response authentication. In addition, using semi-transparent objects to display a chal- lenge SMS text message in an interface, for example, can increase the convenience of responding to the challenge.

Other implementations of secure authentication for accessing remote resources are disclosed, including imple- mentations directed to systems, methods, and apparatus, including computer program products.

BRIEF DESCRIPTION OF THE DRAWINGS

FIG. 5 is a flow chart of an example process for securely authenticating access to remote resources.

DETAILED DESCRIPTION

Figure 1:
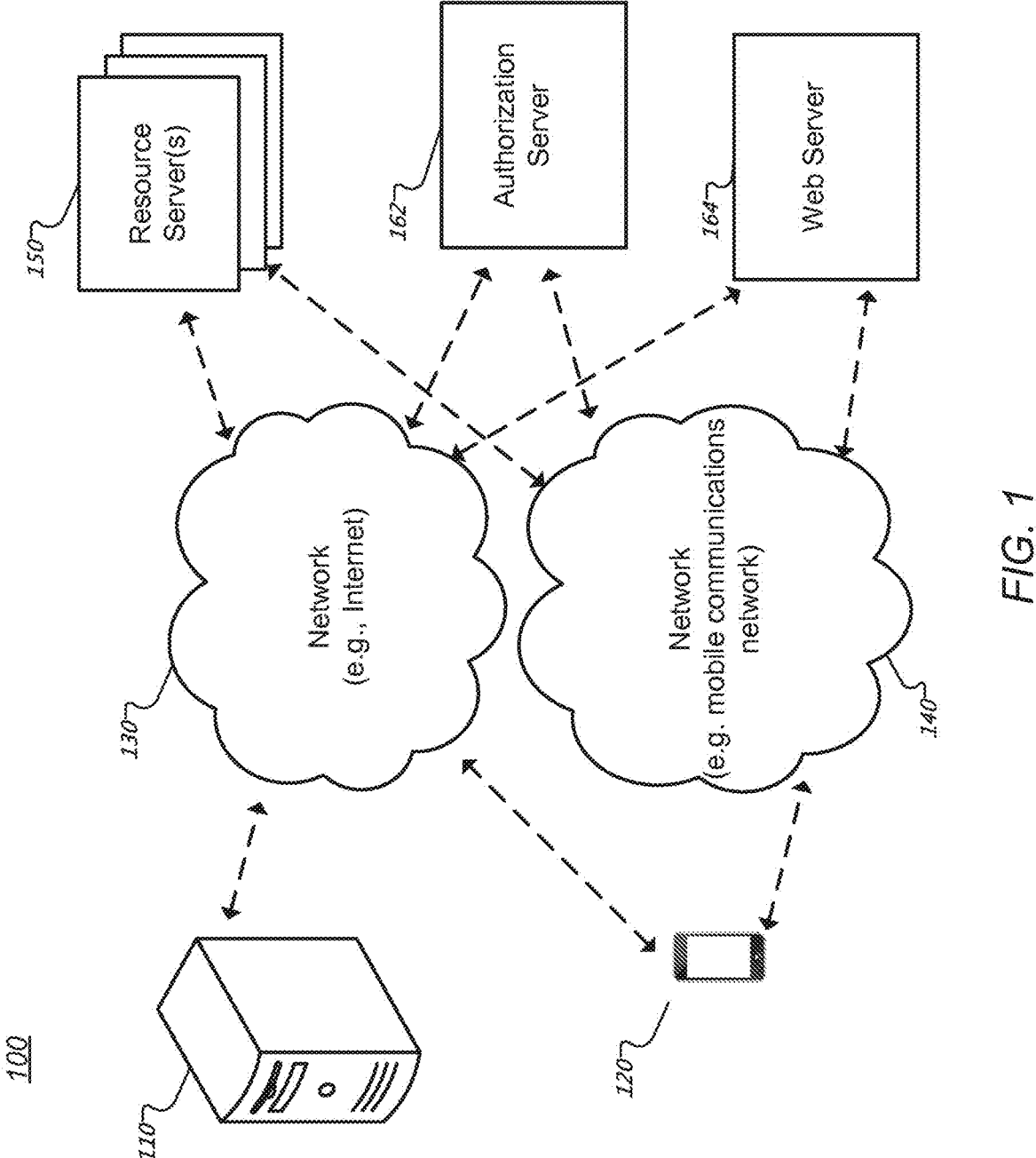
FIG. 1 is a block diagram of an example system for securely authenticating access to remote resources.

FIG. 1 is a block diagram of an example system 100 for securely authenticating access to remote resources. The system 100 includes a first client 110 (e.g., a desktop computer) and a second client 120 (e.g., a mobile phone). The first client 110 and second client 120 can communicate with one or more servers, for example, using a first com- munications channel 130 (e.g., the Internet). As another example, the second client 120 can communicate with the one or more servers using a second communications channel 140 (e.g., using Short Message Service (SMS) protocol on a mobile communications network). The system also includes a resource server 150, an authorization server 162, and a web server 164 (e.g., a VPN web server).

The first client 110 and second client 120 can communi- cate with the authorization server 162 and web server 164 through the first communications channel 130 to authenti- cate access privileges and request access to resources. The resources can be stored on the resource server 150. The resources can include, but are not limited to web pages, images, video, audio, and text. In some implementations, the authorization server 162 and web server 164 can be a same server (e.g., a physical server). In some implementations, the authorization server 162 can be distinct from the web server 164. Other implementations are possible. For example, the authorization server 162 and web server 164 can be config- ured as one or more logical servers or physical servers.

The first client 110 (and/or the second client 120) can request one or more resources from the web server 164. Before the one or more resources are provided to the first client 110, the web server 164 or the authorization server 162 can authenticate the user (e.g., the user's identity) on the first client 110. The web server 164 provides resources to the first client 110 based on access privileges authenticated for the user.

The request for resources and provision of resources, and authentication process, can be communicated over two or more different communications channels, e.g., out of band authentication. For example, the second client 120 can request resources by using the first communications channel

130. A user on the second client 120 can then authenticate his/her access privileges using the second communications channel 140, and the resources can be sent to the second client 120 through the first communications channel 130. Other implementations are possible.

In some implementations, more than two communications channels can be used. In particular, communications between each of the first client 110 and second client 120 and the servers can be performed through three or more different communications channels. As an example, a resource request can be sent by the client through a first communications channel. A challenge can be sent by the authorization server 162 to the client through a second communications channel. A response to the challenge can be sent by the client to the authorization server 162 through a third communications channel. Based on authentication of access privileges using the challenge and response, resources can be sent to the client through a fourth communications channel. In some implementations, some, all, or none of the first, second, third, and fourth communications channels can be the same communications channel.

Example Implementation

A user using the second client 120 can request video (e.g., film dailies), for example, using the first communications channel 130. The request can be received by the web server 164 (e.g., an Apache server). The authorization server 162 (or the web server 164) can request user authentication. The user can initially authenticate using single-sign-on (SSO) credentials, for example.

Figure 2:
FIG. 2 is a screen shot showing an example interface that includes a first web page for entering a first authentication factor.
Figure 2:

FIG. 2 is a screen shot showing an example interface 200 that includes a first web page for entering a first authentication factor. The example interface 200 can represent the interface of the second client 120, e.g., an iPhone™, and the web page can be displayed by a web browser, e.g., Safari™. The web server 164 can use the first communications channel 130 to provide a web page requesting the user to log in (e.g., using multi-factor authentication) to determine the user's access privileges. In particular, the web page can include a first input field for a username 210 (e.g., the first authentication factor) and a second input field for a password 220 (e.g., a second authentication factor). The web server 164 can use the username and password submitted by the user to determine the user's access privileges.

In some implementations, the username and password can be compared to a database (e.g., a Structured Query Language (SQL) database) or to directory services (e.g., an Open Directory or Active Directory server) to determine the user's access privileges. Other implementations are possible. For example, the web server 164 can request that the user authenticate using one or more authentication factors.

After authentication of the username and password, the authorization server 162 can request additional authentication. For example, the authorization server can send an out of band challenge to the client. In some implementations, the challenge can be a token (e.g., a 6-digit randomized code) sent to the user's interface through the second communications channel 140. In some implementations, the token can also be assigned an expiration time (e.g., 10 minutes).

A randomized, single-use Uniform Resource Locator (URL) that identifies a web page can be generated. Because a randomized URL is generated for each authentication, the likelihood that the web page identified by the URL is accessed more than once is decreased. In addition, in some implementations, the URL and its corresponding web page can be deleted after the first access of the web page, so that the URL and the web page can only be used a single time. In some implementations, the URL and its corresponding web page can be deleted after a session ends. For example, a session can end when a web browser displaying the web page is closed or exited. As another example, a session can end after a certain number or amount of resources are accessed. The web page can be generated to accept a response to the challenge, e.g., the token. For example, the web page can have an input field where a user can input the token.

Figure 3B:
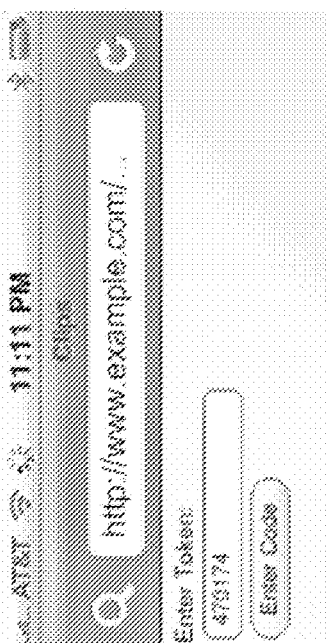
FIG. 3B is a screen shot showing the example interface of FIG. 2 that includes a second web page.
Figure 3B:
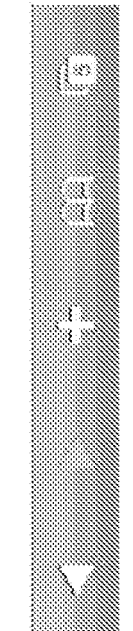
Figure 3A:
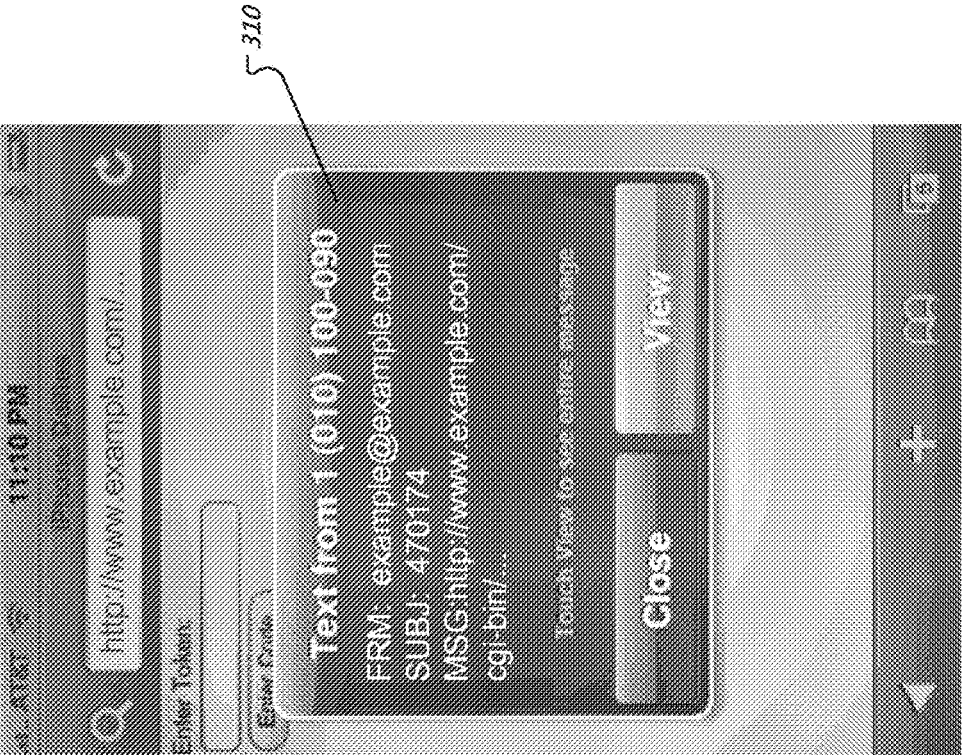
FIG. 3A is a screen shot showing the example interface of FIG. 2 that includes a Short Message Service (SMS) text message.

FIG. 3A is a screen shot showing the example interface 200 of FIG. 2 that includes a Short Message Service (SMS) text 310. The token can be provided to the user using the SMS text message 310 that is sent through the second communications channel 140. In some implementations, the authorization server 162 can determine the second client's contact information (e.g., a mobile phone number associated with an iPhone™) from a database or directory services, based on a SIM corresponding to the client. The authorization server 162 can then send an SMS relay to the client (e.g., #########@txt.example.com).

In some implementations, the SMS text 310 can be displayed as a semi-transparent (or translucent) message in the interface. As a result of the message being semi-transparent, the user does not have to switch between objects (e.g., windows, widgets) in the interface to view the token and enter it into the web page. In these and other implementations, the message can also be always on top (e.g., always displayed in the interface until the message is closed). Other implementations are possible. For example, upon receipt of the token, the token can be automatically copied into the clipboard of the interface, so that the user can simply paste the token into the input field of the web page.

The user can provide a response, based on the token, using the first communications channel 130 (e.g., using Wi-Fi or 3G). FIG. 3B is a screen shot showing the example interface of FIG. 2 that includes a second web page. The user can enter the token into the field so that the token is sent to the authorization server using the first communications channel 130.

In some implementations, the user can simply provide the same token back to the authorization server 162. In some implementations, the user can provide a different response that is based on the token. For example, a predetermined algorithm can be used to transform the token into the response to be returned to the authorization server 162. Alternatively, the user can also provide the response through the second communications channel 140. In particular, the user can send the response to the authorization server using a reply SMS text message. Other implementations are possible. For example, the challenge could include a phone number or email address, and the user can respond using an appropriate communications channel. In particular, the user can dial the phone number or send an email to the email address as a means for responding to the challenge.

After the user successfully authenticates with the authorization server 162, the web server 164 can provide the user a URL to another web page with access to remote resources. The URL can be a randomized, single-use URL. In some implementations, after a user first accesses the web page, the authorization server 162 can cancel the token. Other implementations are possible. For example, the token can be canceled after a predetermined amount of time (e.g., 20 minutes) or a predetermined number of access attempts (e.g., two access attempts).

Figure 4:
FIG. 4 is a screen shot showing the example interface of FIG. 2 that includes a third web page with access to remote resources.

FIG. 4 is a screen shot showing the example interface of FIG. 2 that includes a third web page with access to remote resources. The web page with access to remote resources can be a custom web page. The web server 164 can generate the custom web page (e.g., using Personal Home Page (PHP) script) based on the user's access privileges. For example, the custom web page can include one or more URL's that are associated with resources that the user has sufficient privileges to access.

The one or more URL's can be masked URL's. The one or more URL's can be considered masked URL's because they are not the actual URL that directly identifies the actual location of the resources, e.g., the actual URL is masked. The masked URL can be indirectly associated with a corresponding resource. In some implementations, a mapping table (e.g., a proxy table) can be used to map a masked URL to the location of a corresponding resource. For example, a masked URL can be mapped (e.g., linked) to a function (e.g., a function call) on the resource server 150 that can provide direct access to a resource. As another example, the masked URL can be mapped to the actual URL that directly identifies the actual location of the resource on the resource server 150. The masked URL and mapping table can be generated using Ajax, for example.

A user can access (e.g., click on) the masked URL, and an associated resource can be sent to the client. In some implementations, an electronic document corresponding to the resource can be sent to the client. An electronic document (which for brevity will simply be referred to as a document) does not necessarily correspond to a file. A document may be stored in a portion of a file that holds other documents, in a single file dedicated to the document in question, or in multiple coordinated files. In some implementations, the resource can be streamed to the client, so that the likelihood of further distribution of the resource can be reduced. For example, QuickTime™ Streaming Server (QTSS) can be used to stream video to a client.

Example Process

FIG. 5 is a flow chart of an example process for securely authenticating access to remote resources. The process includes receiving 500 a first authentication factor from an interface using a first communications channel. For example, the web server 164 can receive a first authentication factor. Access privileges can be determined 510 based on the first authentication factor. For example, the web server 164 or the authorization server 162 can determine access privileges. A first random Uniform Resource Locator (URL) and a first resource can be generated 520 based on the access privileges. The first resource can be identified by the first random URL and configured to receive a second authentication factor, and the first random URL can be single-use. For example, the web server 164 can generate a first random URL and a first resource. The first resource can be provided 530 to the interface using the first communications channel. For example, the web server 164 can provide the first resource to the interface. The second authentication factor can be provided 540 to the interface using a second communications channel. For example, the authorization server 162 can provide the second authentication factor to the interface.

Other Example Implementations

A number of implementations have been described. Nevertheless, it will be understood that various modifications may be made. Elements of one or more implementations may be combined, deleted, modified, or supplemented to form further implementations.

For example, in some implementations, the first client 110 can be used to request resources using the first communications channel 130. As described above, the authorization server 162 can provide a challenge to a second client 120 (that the user can access). The user can use the second client

120 or the first client 110 to submit a response. In addition, the user can use either the first communications channel 130 or the second communications channel 140 to send the response.

In some implementations, the SMS text message that is sent to the second client 120 can provide a randomized, single-use URL, instead of a token. The randomized, single-use URL can be generated in the manner described above, and the randomized, single-use URL can be used to access a custom web page as described with reference to FIG. 4.

In some implementations, in response to the challenge sent using an SMS text message, the user can respond with another SMS text message that includes a predetermined shared secret. For example, the secret can be a simple password, or the secret can be a compound password that contains a predetermined password and data provided in the challenge SMS text message. As an example, the authorization server's challenge may include the token "457826". The user may know a predetermined password "AL1". The user may also know a predetermined algorithm to combine the last four digits of the server's challenge with the predetermined password. In particular, the user can respond to the challenge with an SMS text message that includes "AL17826".

In some implementations, other levels of security or authentication can be added. For example, a Global Positioning System (GPS) location of the client could be used to authenticate the client, based on a predetermined location of the user. As another example, various forms of Digital Rights Management (DRM) can be used to secure the resources that are sent to the client. As yet another example, the client could be used as a universal dongle. In particular, the systems and techniques described can be used for secure authentication for access to other resources, such as but not limited to, software applications and computing resources (e.g., physical servers and computers). For example, access to the computing resources can include access to upload resources (e.g., upload video to the resource server 150).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a digital picture frame, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Furthermore, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method for enabling a first device to access resources, the method comprising, at the first device:

providing, to a second device, a request to access at least one resource through the second device, wherein the request includes user account credentials;

receiving a message that includes a first secure value, wherein the message is received in response to the second device authenticating the user account credentials;

generating a second secure value that is based on at least the first secure value;

receiving, from the second device, instructions for accessing the at least one resource, wherein the instructions are received in response to the second device authenticating the second secure value; and accessing the at least one resource using the instructions.

2. The method of claim 1, further comprising, subsequent to generating the second secure value:

providing the second secure value to the second device.

3. The method of claim 1, wherein the second secure value is provided to the second device over a second communications channel that is different from a first communications channel over which the request is transmitted.

4. The method of claim 1, further comprising:

displaying the second secure value on a display device with which the first device is communicably coupled.

5. The method of claim 1, wherein the instructions expire after a threshold amount of time lapses relative to the at least one resource being accessed by the first device.

6. The method of claim 1, wherein the first and second secure values comprise randomized numerical codes.

7. The method of claim 1, wherein the instructions comprise a single-use uniform resource locator (URL).

8. A non-transitory computer readable storage medium storing instructions that, when executed by at least one processor included in a first device, cause the first device to carry out steps that include:

providing, to a second device, a request to access at least one resource through the second device, wherein the request includes user account credentials;

receiving a message that includes a first secure value, wherein the message is received in response to the second device authenticating the user account credentials;

generating a second secure value that is based on at least the first secure value;

receiving, from the second device, instructions for accessing the at least one resource, wherein the instructions are received in response to the second device authenticating the second secure value; and accessing the at least one resource using the instructions.

9. The non-transitory computer readable storage medium of claim 8, wherein the steps further include, subsequent to generating the second secure value:

providing the second secure value to the second device.

10. The non-transitory computer readable storage medium of claim 8, wherein the second secure value is provided to the second device over a second communications channel that is different from a first communications channel over which the request is transmitted.

11. The non-transitory computer readable storage medium of claim 8, wherein the steps further include:

displaying the second secure value on a display device with which the first device is communicably coupled.

12. The non-transitory computer readable storage medium of claim 8, wherein the instructions expire after a threshold amount of time lapses relative to the at least one resource being accessed by the first device.

13. The non-transitory computer readable storage medium of claim 8, wherein the first and second secure values comprise randomized numerical codes.

14. The non-transitory computer readable storage medium of claim 8, wherein the instructions comprise a single-use uniform resource locator (URL).

15. A first device, comprising:

at least one processor; and at least one memory storing instructions that, when executed by the at least one processor, cause the first device to carry out steps that include:

providing, to a second device, a request to access at least one resource through the second device, wherein the request includes user account credentials;

receiving a message that includes a first secure value, wherein the message is received in response to the second device authenticating the user account credentials;

generating a second secure value that is based on at least the first secure value;

receiving, from the second device, instructions for accessing the at least one resource, wherein the instructions are received in response to the second device authenticating the second secure value; and accessing the at least one resource using the instructions.

16. The first device of claim 15, wherein the steps further include, subsequent to generating the second secure value:

providing the second secure value to the second device.

17. The first device of claim 15, wherein the second secure value is provided to the second device over a second communications channel that is different from a first communications channel over which the request is transmitted.

18. The first device of claim 15, wherein the steps further include:

displaying the second secure value on a display device with which the first device is communicably coupled.

19. The first device of claim 15, wherein the instructions expire after a threshold amount of time lapses relative to the at least one resource being accessed by the first device.

20. The first device of claim 15, wherein the first and second secure values comprise randomized numerical codes.

* * * * *